US009260125B2

(12) United States Patent
Ellington et al.

(10) Patent No.: US 9,260,125 B2
(45) Date of Patent: Feb. 16, 2016

(54) PALLET TRANSPORTATION ASSEMBLY AND PROCESSES OF TRANSPORTING PALLETS USING THE SAME

(75) Inventors: Stanley Charles Ellington, Trussville, AL (US); Nicholas Elsworth Petroff, Jr., Ooltewah, TN (US); Melvin D. Reeves, II, Chattanooga, TN (US); John P. Barry, Alpharetta, GA (US); Ira Donavan Youmans, Jr., Evans, GA (US)

(73) Assignee: Coca-Cola Bottling Co. United, Inc., Birmingham, AL (US)

( * ) Notice: Subject to any disclaimer, the term of this patent is extended or adjusted under 35 U.S.C. 154(b) by 612 days.

(21) Appl. No.: 13/404,797

(22) Filed: Feb. 24, 2012

(65) Prior Publication Data

US 2013/0223962 A1    Aug. 29, 2013

(51) Int. Cl.
*B66F 9/18*   (2006.01)
*B62B 3/06*   (2006.01)
*B66F 9/12*   (2006.01)

(52) U.S. Cl.
CPC .............. *B62B 3/06* (2013.01); *B62B 2203/24* (2013.01); *B62B 2203/29* (2013.01); *B62B 2203/60* (2013.01); *B66F 9/12* (2013.01)

(58) Field of Classification Search
CPC ................ B66F 9/12; B66F 9/16; B66F 9/18; B66F 9/145; B62B 2203/24; B62B 2203/29; B62B 2203/60; B62B 3/06
USPC ................... 414/785, 607; 187/237
See application file for complete search history.

(56) References Cited

U.S. PATENT DOCUMENTS

| 2,610,751 | A |   | 9/1952  | Bevan |
|-----------|---|---|---------|-------|
| 2,818,989 | A | * | 1/1958  | Burke ........................... 414/608 |
| 2,827,189 | A |   | 3/1958  | Knudstrup |
| 3,039,635 | A | * | 6/1962  | Drackett et al. .............. 414/662 |
| 3,097,009 | A | * | 7/1963  | Martin ......................... 294/63.1 |
| 3,301,419 | A | * | 1/1967  | Molden et al. ................ 414/428 |
| 3,625,385 | A |   | 12/1971 | Ide |
| 3,734,329 | A | * | 5/1973  | Grelck ........................... 414/785 |
| 3,791,544 | A |   | 2/1974  | Moses |
| 4,102,464 | A |   | 7/1978  | Schuster |
| 4,460,306 | A | * | 7/1984  | Hawkins ...................... 414/427 |
| 4,497,606 | A | * | 2/1985  | Hobson ........................ 414/607 |
| 4,925,357 | A | * | 5/1990  | Cisternino et al. ........... 414/495 |
| 5,456,565 | A |   | 10/1995 | Pigott et al. |
| 5,897,286 | A |   | 4/1999  | Whittaker |
| 6,042,329 | A |   | 3/2000  | Marquez et al. |
| 6,206,628 | B1 |  | 3/2001  | McDermott |
| 6,749,387 | B1 | * | 6/2004 | Saxer et al. ................... 414/458 |
| 2009/0314582 | A1 |   | 12/2009 | Meijer |
| 2010/0295261 | A1 | * | 11/2010 | Ellington ................... 280/43.12 |
| 2012/0211308 | A1 | * | 8/2012  | Issartel ......................... 187/237 |

* cited by examiner

*Primary Examiner* — Saul Rodriguez
*Assistant Examiner* — Mark Hageman
(74) *Attorney, Agent, or Firm* — Katten Muchin Rosenman LLP

(57) ABSTRACT

The present invention relates to a pallet transportation assembly comprising a first tine, a second tine, and a body coupled to the first and second tines comprising a tine adjustment system, a wheel, and a vertical backing portion, wherein the first or second tine further comprises a riser hinged to the first or second tine.

11 Claims, 8 Drawing Sheets

PALLET TRANSPORTATION ASSEMBLY AND PROCESSES OF TRANSPORTING PALLETS USING THE SAME

BACKGROUND OF THE INVENTION

1. Field of the Invention

The present invention relates to a pallet transportation assembly comprising a first tine, a second tine, and a body coupled to the first and second tines comprising a tine adjustment system, a wheel, and a vertical backing portion, wherein the first or second tine further comprises a riser hinged to the first or second tine.

2. Background Art

Manually operated pallet jacks include mechanical devices used primarily for interior applications in such locations as warehouses and some larger consumer stores. The term "manually" refers to the means for moving and operating the pallets jacks: typically, they use hydraulic, pneumatic or electric lifting mechanisms that an operator enables to lift goods. Pallet jacks typically have two or more tines, that are placed under a pallet, upon which is stored the goods to be moved. In the U.S., loaded pallets are typically about 4 feet long by 4 feet wide, and can be between a couple of inches to as much as 8-10 feet in height. The major considerations in the maximum height are the weight to be lifted and the center of gravity.

Other types of pallet jacks include those that are completely or semi-automated. These pallet jacks can include an internal combustion engine or motor, or an electric or propane operated motor that drives the pallet jack according to mechanical inputs received from the operator. Some of these pallet jacks can place goods on pallet several stories in height (20'-40').

As briefly discussed above, pallet jacks are usually operated in the interior of buildings, on substantially smooth, pre-stressed concrete floors. These floors are extremely smooth and extremely strong. Pallet jacks are generally designed to operate in such an interior environment, and usually have two small wheels located in the rear portion of the pallet jack, directly under the lifting mechanism. The tines are located outwardly from the centrally located rear wheels, and the lifting mechanism is located directly over the centrally located rear wheels. Such known pallet jacks are generally useful for lifting heavily loaded pallets, wherein the pallets have a length (measured in the same direction as the tines extend from the pallet jack) to width ratio of about 1.0 and less.

Pallets are used for receiving and handling heavy or bulky loads to facilitate the stacking of several articles to comprise the load. Normally the load and pallet are shipped as a unit. A conventional pallet is a wooden structure made up of several parallel, horizontal stringers and several cross boards, all nailed together to form a rectangular element. In two-way pallets, the tines enter between the stringers and engage the cross boards from below. In a four-way pallet, the stringers are cut out in two areas each to provide inverted U-shaped openings in what is known as the "four-way" side spaced apart to receive the tines. A forklift may enter selectively, from any of the four sides of the pallet, whereas in the two-way pallet entry can occur from only two opposite sides.

All conventional pallets are not exactly alike, but are dimensioned so as to accommodate most fork-lifts. The entry openings are made wide enough to accommodate different tine spacing as well as to enable easy entry without precise maneuvering of the fork-lift. Nevertheless, it is not possible for a pallet jack to unload or load a pallet from the four-way side of a pallet because the inverted U-shaped openings of the pallet are not wide enough to accept the width of a pallet jack tine.

Due to these varying base configurations, certain pallets may require a first pallet transportation assembly, while other pallets require a second transportation assembly.

In a conventional pallet jack, the tines sit atop wheels. The tines may be raised slightly to subsequently raise a pallet off the ground, which transfers the weight of the load from the pallet legs to the pallet jack wheels. In this position, the wheels support the tines and the accompanying load and allow the load to be easily transported. The top surfaces of the tines, however, are at a predetermined distance from the bottoms of the wheels and from the ground. This predetermined distance allows for insertion into a conventional pallet. Other pallet designs, however, may have longer legs and, as such, may sit higher off the ground than conventional pallets. Accordingly, the same predetermined distance may not allow the tines to engage and raise such a pallet while keeping the pallet jack wheels on the ground. As a result, the weigh of the load is not transferred from the pallet legs to the pallet jack wheels and the load cannot be effectively transported.

Also, when transporting up an incline, in taller pallet designs, the legs of the pallet extend farther downward than a conventional pallet. As such, the legs come into contact with the incline, which may cause the pallets to dislodge from the pallet transportation assemblies and/or to topple.

Thus, a need exists for a pallet transportation assembly that can transport pallets requiring more vertical clearance from the ground and are capable of transporting pallets having different base configurations.

SUMMARY OF THE INVENTION

In some embodiments, the present invention is directed to a pallet transportation assembly comprising a first tine having a top, a bottom, an inner edge, and an outer edge; a second tine having a top, a bottom, an inner edge, and an outer edge; and a body coupled to the first and second tines comprising an tine adjustment system, a wheel, and a vertical backing portion; wherein the first or second tine further comprises a riser hinged to the first or second tine. In some embodiments, the riser rotates about a hinge on an axis parallel to the first or second tines.

In some embodiments, the tine adjustment system is configured to rotate the one or more risers about the axis parallel to the first or second tine. In some embodiments, the tine adjustment system is configured to adjust the elevation, pitch, yaw, length or combinations thereof, of the first or second tine. In some embodiments, the tine adjustment system operates pneumatically, electrically, hydraulically or a combination thereof.

In some embodiments, the first tine comprises a first riser and the second tine comprises a second riser. In some embodiments, the first riser has a height that is the same or different as the second riser. In some embodiments, the riser is configured to receive a base configuration of a pallet.

In some embodiments, the first or second tine further comprises a guard. In some embodiments, the guard is mounted to the first or second tine.

In some embodiments, the wherein the vertical backing portion comprises a lashing system. In some embodiments, the lashing system comprises a strap, buckle and ratcheting mechanism. In some embodiments, the vertical backing portion comprises an adjustable wall. In some embodiments, the first and second tines are co-planar and parallel to each other.

In other embodiments, the present invention is directed to a pallet transportation assembly comprising a first tine having a riser hinged to an inner edge of the first tine, wherein the riser rotates about a hinge on an axis parallel to the first tine; a second tine having a riser hinged to an inner or outer edge of the second tine, wherein the riser rotates about a hinge on an axis parallel to the second tine; a body coupled to the first and second tines comprising a tine adjustment system; a wheel, and a vertical backing portion.

In other embodiments, the present invention is directed to a process for transporting a first pallet having a first base configuration and a second pallet having a second base configuration, the process comprising the step of (a) providing a pallet transportation assembly comprising a first tine having a top, a bottom, an inner edge, and an outer edge; a second tine having a top, a bottom, an inner edge, and an outer edge; a body coupled to the first and second tines comprising a tine adjustment system, a wheel, and a vertical backing portion; wherein the first or second tine further comprises a riser hinged to the first or second riser; (b) adjusting the riser in a first position to accommodate the first base configuration; (c) transporting the first pallet; (d) positioning the riser in a second position to accommodate the second base configuration; and (e) transporting the second pallet; wherein the first pallet and the second pallet are transported using the same pallet transportation assembly.

BRIEF DESCRIPTION OF DRAWINGS

The invention is described in detail below with reference to the appended drawings, wherein like numerals designate similar parts.

DETAILED DESCRIPTION OF THE INVENTION

Figure 1:
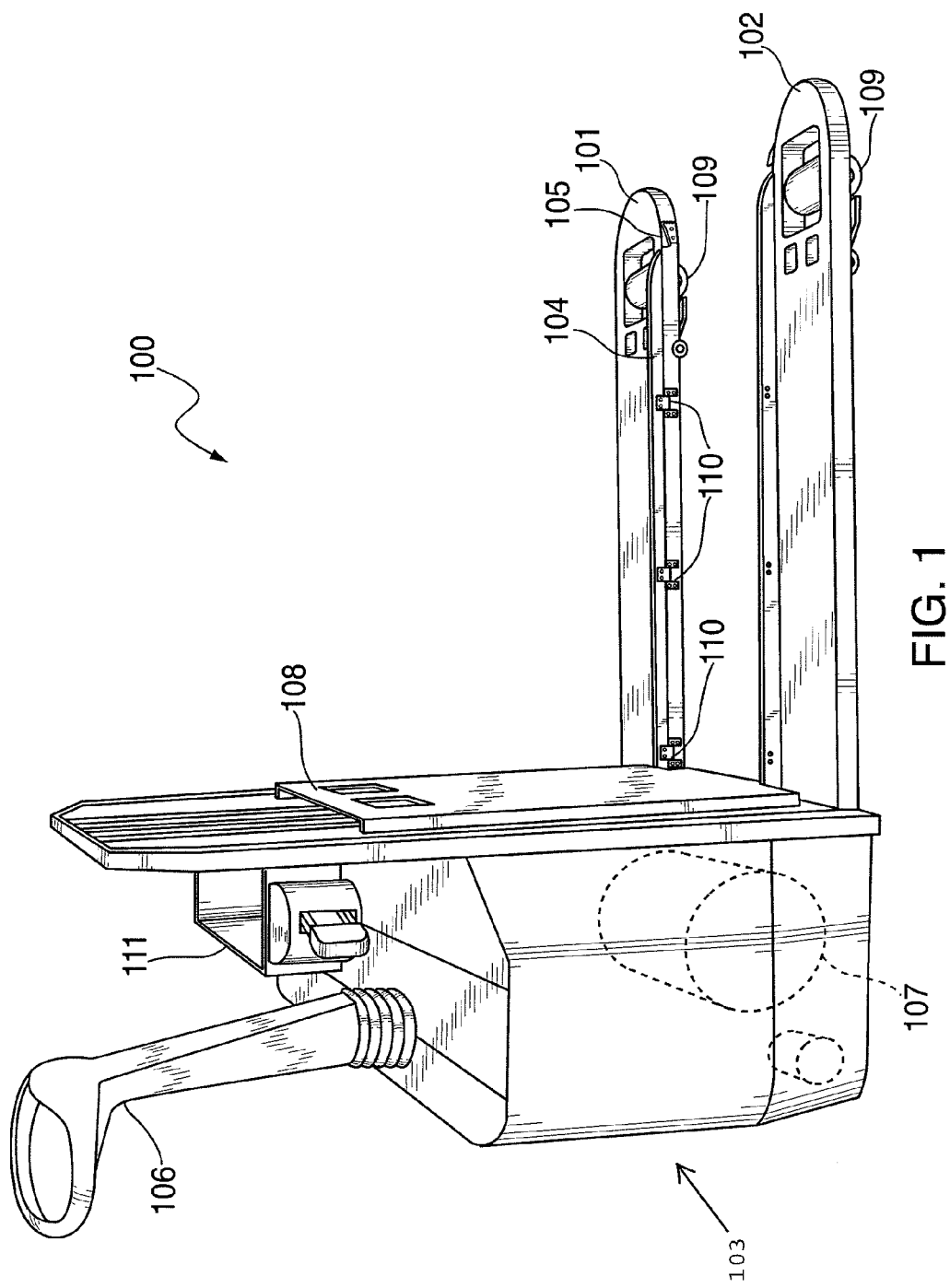
FIG. 1 shows a pallet transportation assembly in accordance with one embodiment of the present invention.

The various features of the embodiments will now be described with reference to the drawing figures, in which like parts are identified with the same reference characters. The following description is not to be taken in a limiting sense, but is provided merely for the purpose of describing the general principles of the invention.

According to an embodiment of the present invention, a pallet transportation assembly 100 is disclosed and described herein having a number of significant advantages over conventional pallet transportation assemblies. According to the embodiment depicted in FIG. 1, pallet transportation assembly 100 comprises a first tine 101 and a second tine 102 each having a top, a bottom, an outer edge and an inner edge.

According to embodiments of the present invention, tines 101 and 102 further comprise a riser 104 and a guard 105. A pallet transportation assembly of the present invention further comprises a body 103 having a lifting mechanism 106, a wheel 107 and a vertical backing portion 108.

In some embodiments, first tine 101 is similar to second tine 102, in that each are parallel to each other, of similar dimensions and configuration, and lie within the same horizontal plane. First and second tines 101, 102 are connected to body 103 at their rear-most portion.

In some embodiments, the first and second tine 101, 102 further comprise a front wheel 109 and front wheel lifting assembly components. In some embodiments, front wheel lifting assembly components lift front wheel 109 when an operator engages the lifting mechanism discussed below.

Front wheels 109 are configured to provide substantial stability and ease of operation when transporting a plurality of loaded pallets, especially when such transport occurs on a substantially uneven or non-smooth terrain, as in a gravel parking lot, or one in which the pavement has cracks and/or potholes. In some embodiments, the front wheels designed for use in the present invention are wider then they are tall or have the same width and height. As those of ordinary skill in the art understand, the relationship between height and width can be referred to as an aspect ratio:

$$\text{Aspect Ratio} = \frac{HeightofWheel}{WidthofWheel}$$

Accordingly, in some embodiments of the present invention front wheels 109 have an aspect ratio of less than 1, 1, or greater than 1.

As discussed above, front wheels 109 with aspect ratios in this range provide a pallet transportation assembly of the present invention with the ability to negotiate substantially uneven or non-smooth terrain. Furthermore, because wheels are selected made of the appropriate material, which are not used on known pallet transportation assemblies, a pallet transportation assembly of the present invention will not scuff or scrape the floor of a convenience store or other retail establishment. According to one embodiment of the present invention, front wheels 109 are made with a rubber compound. According to another embodiment of the present invention, front wheels 109 can be made from rubber or semi-hard plastic.

Figure 1A:
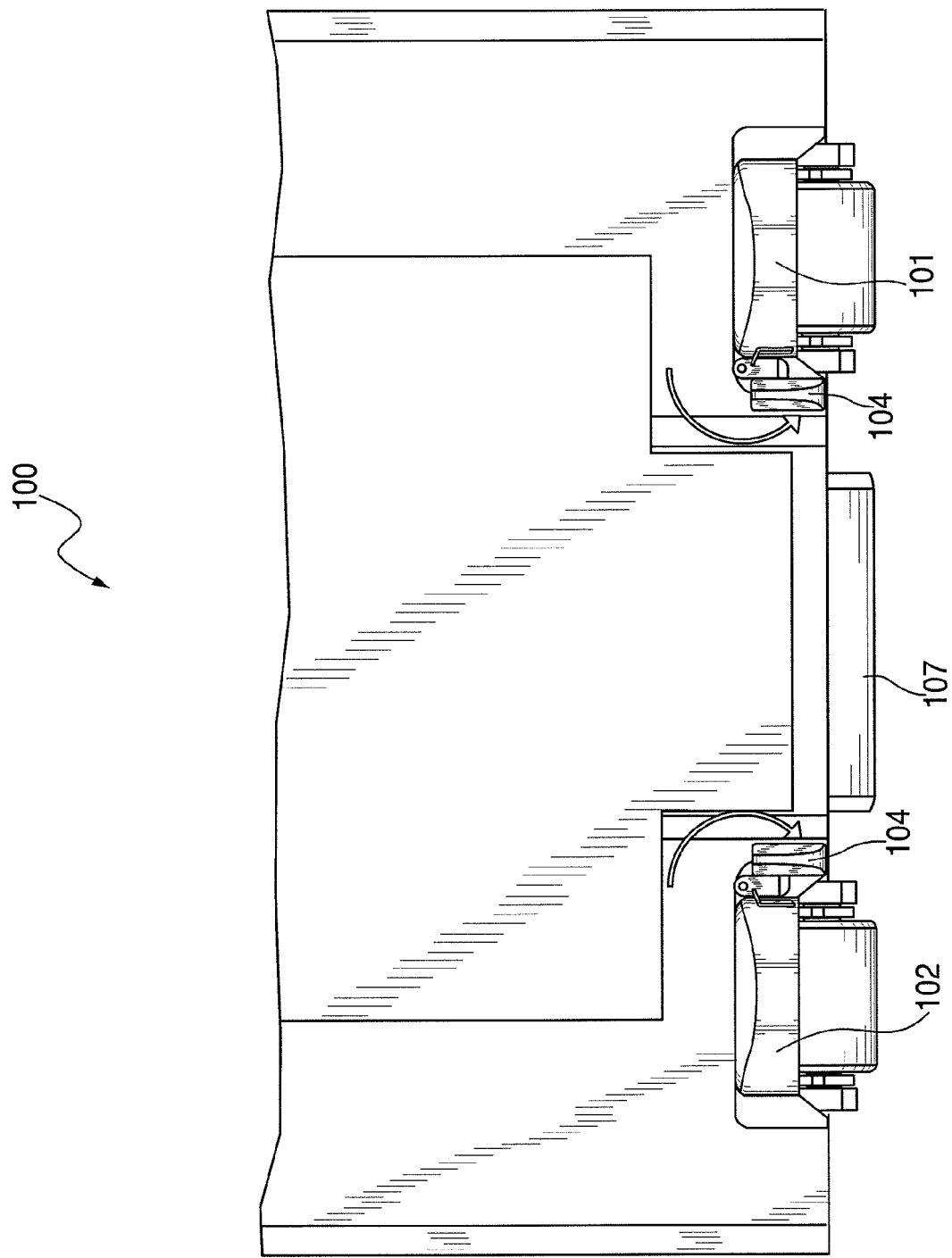
FIG. 1A shows a cross section of a pallet transportation assembly in accordance with one embodiment of the present invention.
Figure 1B:
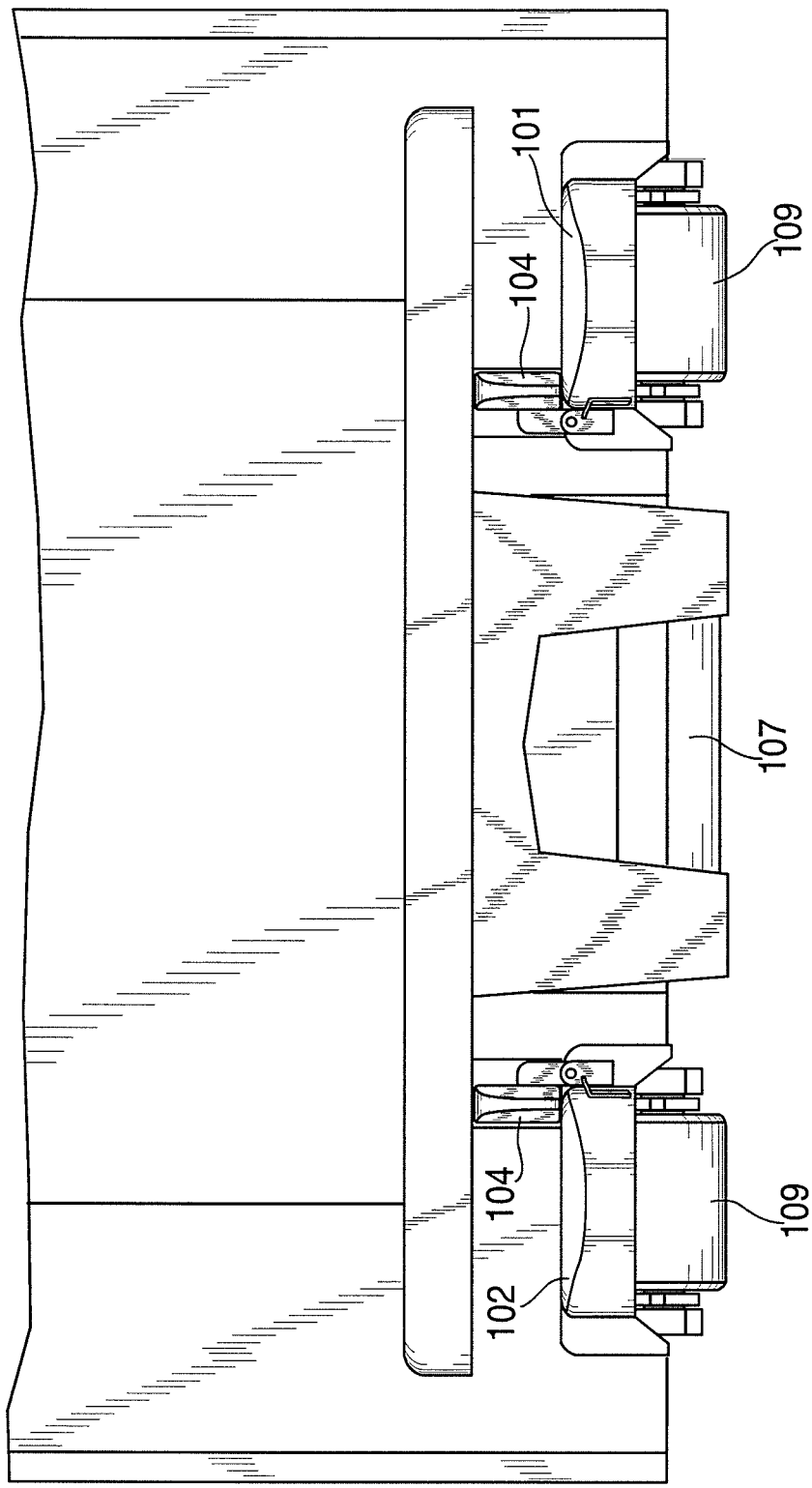
FIG. 1B shows a cross section of a pallet transportation assembly in accordance with one embodiment of the present invention.

According to the embodiment depicted in FIG. 1, riser 104 is hinged to tine 101 by one or more hinges 110. A hinge allows riser 104 to rotate about the hinge on an axis parallel to the tines. As shown in one embodiment depicted in FIG. 1A, the hinge may allow the riser to rotate into a first position, i.e., a "down" position, such that the top of the tine is uniform and flat. As shown in another embodiment depicted in FIG. 1B, the hinge may also allow the riser to rotate into a second position, i.e., an "up" position, wherein the riser provides an elevated surface on the top of the tine. In some embodiments, the tine may be configured to prevent or reduce the rotational movement of the riser during transportation. In some embodiments, in addition to the "up" and "down" positions described above, the tine may be configured to lock the riser in a number of positions to accommodate pallets having different base configurations. For example, a tine may be configured to provide optional intermediate positions between the "up" and "down" positions, e.g., a 45° position that is halfway between the "up" and "down" positions. In some embodiments, the riser may be hinged to the tine in a manner that allows for the riser to rotate into and out of the plane of the tine. For example, in some embodiments, a tine further comprises a cavity or cut out in the plane of the tine that accommodates the riser.

In some embodiments, the tines of a pallet transportation assembly of the present invention may comprise one or more risers of the same or varying heights. For example, according to the embodiment depicted in FIG. 2, a pallet transportation assembly of the present invention may comprise a first riser located on an inner edge of a first tine 101 and a second riser located on an inner edge of a second tine 102. In some embodiments, a tine may compromise two risers, one on the outer edge and one on the inner edge. In other embodiments a tine may have a riser of a first height, and another tine may have a riser of second height, wherein the first height is the same or different than the second height. In other embodiments, a tine may have more than one riser having the same or different heights.

A riser of the present invention is comprised of a material that is the same as or different than the material from which the tine is made. For example, in some embodiments, a tine is made from a metal, e.g., steel, and riser 104 is also made from steel. In other embodiments, tine 101 is made from a metal, e.g., steel, and riser 104 is made from a material softer than steel, e.g., rubber. In some embodiments, the riser is made from a material that reduces damage to a pallet. Examples of materials from which the riser can be made include, but are not limited to steel, aluminum, iron, rubber, polymeric materials, or combinations thereof.

A riser of the present invention may comprise various shapes or configurations in order to accommodate various base configurations of the pallet to be transported. For example, a riser of the present invention may comprise notches, staggered heights, platforms, tongue and groove components, or combinations thereof. While not being bound by any particular theory, in some embodiments a riser having a configuration that complements a base configuration of the pallet being transported increases the surface area shared between the riser and the pallet, thus, increasing the stability of the pallet being transported.

Figure 3A:
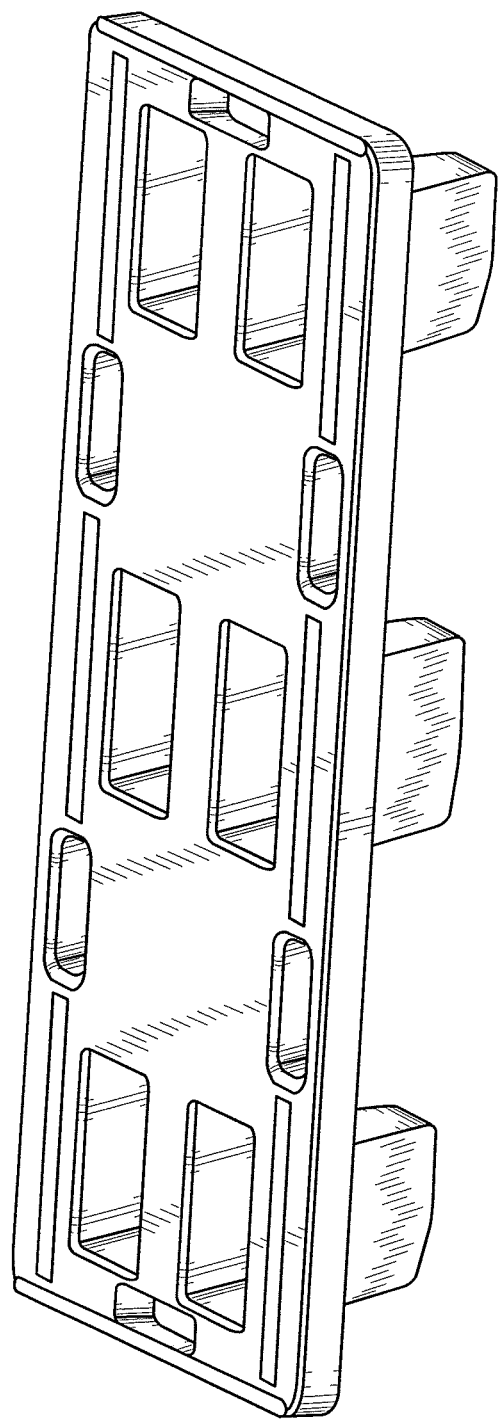
FIG. 3A shows a pallet suitable for use with the present invention.
Figure 3B:
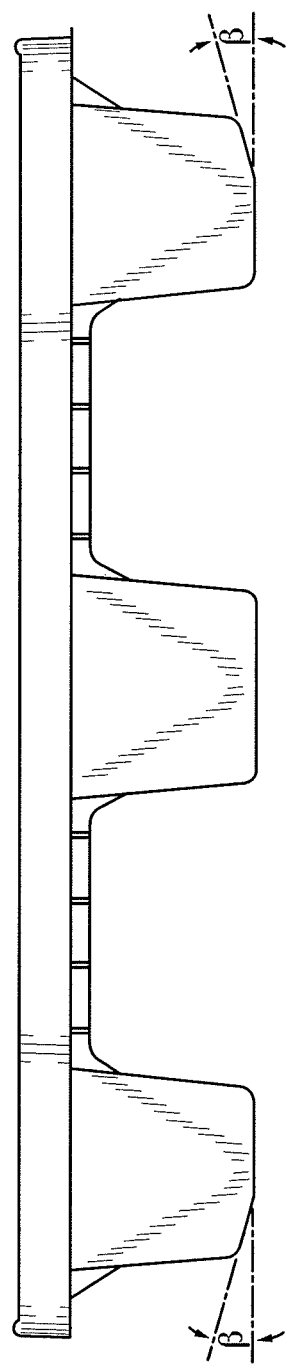
FIG. 3B shows a pallet suitable for use with the present invention.

A riser of the present invention provides substantial versatility to a pallet transportation assembly to allow for the seamless transportation of pallets having varying base configurations. For example, a given cargo may comprise loads carried on a pallet having a first base configuration as depicted in FIG. 3A and additional loads carried on a pallet having a second base configuration. Examples of a pallet depicted in FIG. 3A are described in detail in U.S. Pat. No. 7,987,797, which is incorporated by reference in its entirety herein. As discussed in U.S. Pat. No. 7,987,797 and shown in FIG. 3B the outer feet of the pallet can be angled (β) to reduce any potential impact the pallet may have when transported on a sloped surface. However, the present inventors have found that despite these designed features, the increased height of the pallet feet create challenges when transporting these pallets on uneven and/or sloped surfaces. While not being bound to any particular theory, the present invention overcomes these challenges by providing additional vertical clearance with the ground through use of a riser.

Figure 4:
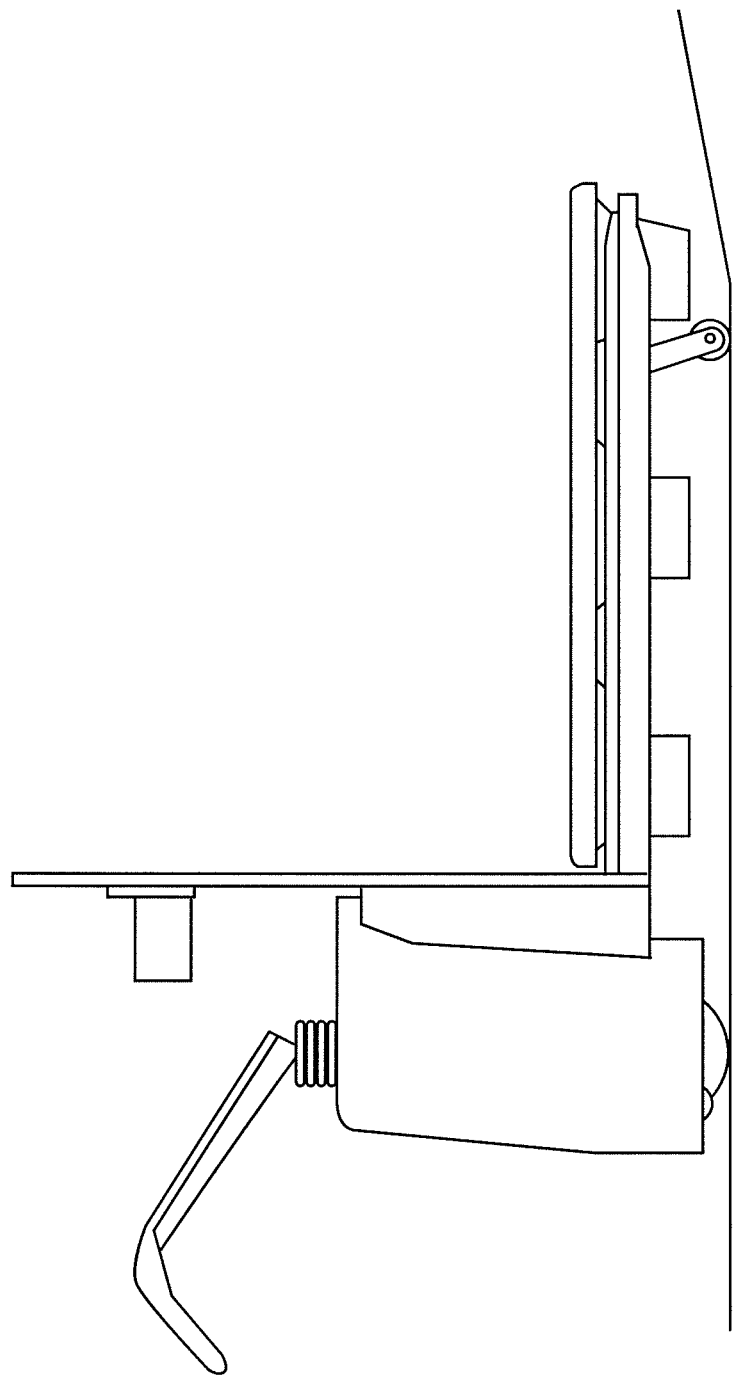
FIG. 4 shows transportation of a pallet up a sloped surface using a pallet transportation assembly of the present invention.

For example, when transporting a the aforementioned pallet up an inclined surface using a conventional pallet jack, the bottom of the pallet feet will impact the ramp and cause loss or reduction in pallet mobility, jarring of pallet cargo, or damage to the pallet and/or the cargo contained thereon. In contrast, as shown in FIG. 4, when such a pallet is transported using a pallet transportation assembly of the present invention, a riser in the "up" position provides additional vertical clearance so the pallet avoids contact with the ground despite the change in surface level, thereby facilitating the transport of the pallet. Furthermore, a riser of the present invention may be rotated into multiple positions allowing for seamless transportation of pallets having different base configurations.

Figure 2:
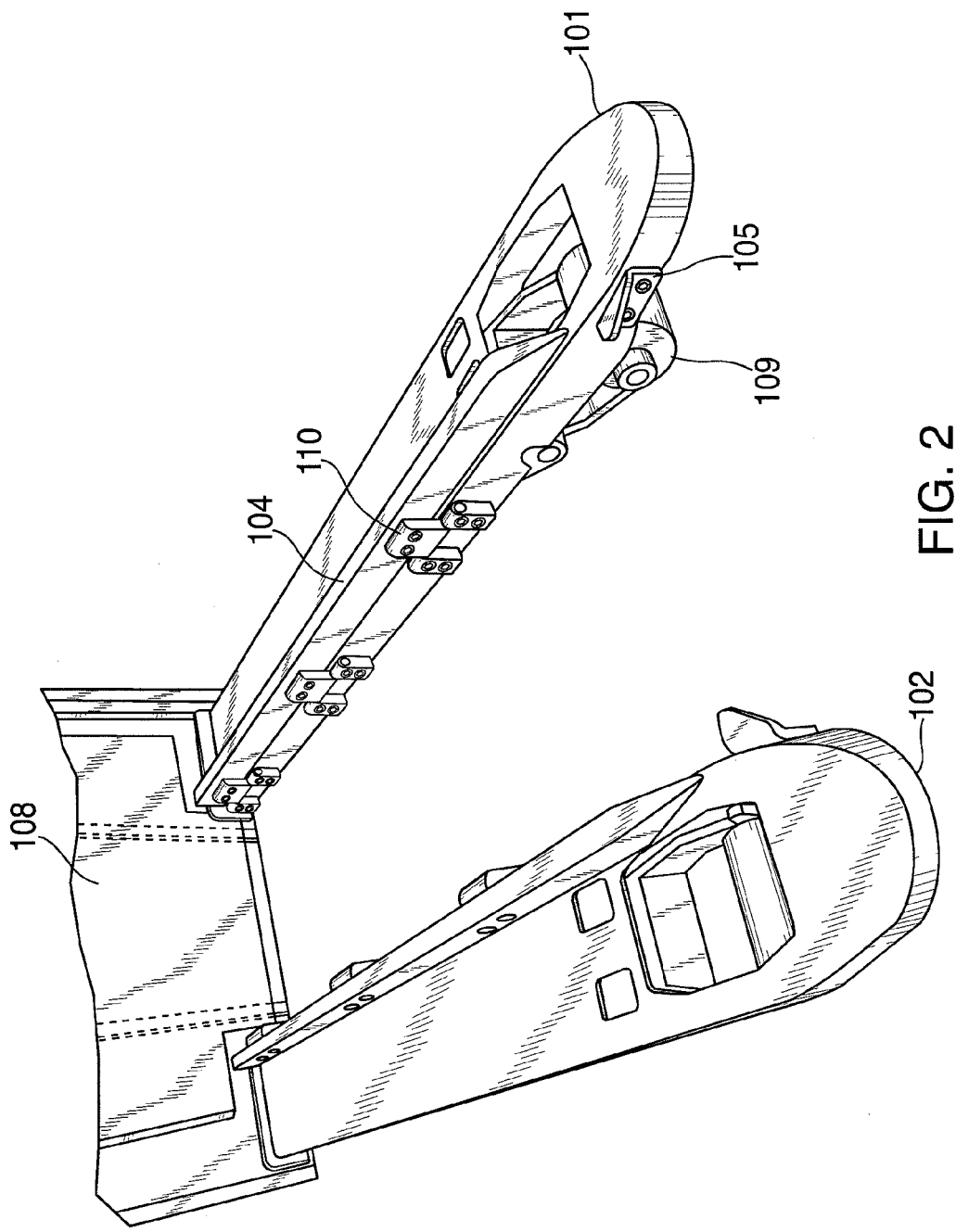
FIG. 2 shows a pallet transportation assembly in accordance with one embodiment of the present invention.

According to the embodiment depicted in FIG. 2, a tine of the present invention further comprises a guard 105. In some embodiments, guard 105 is mounted to the first or second tine. For example, in some embodiments, guard 105 is mounted to a tine of the invention by screws, bolts, fasteners, welding, or combinations thereof. In other embodiments, guard 105 is part of a tine, i.e., not separately mounted into a tine, but created as a machined portion of the tine. In some embodiments, a guard protects the riser from accidental contact during operation of the pallet transportation assembly. In some embodiments, guard 105 is located on an edge of the tine containing the riser. In some embodiments, guard 105 comprises a protrusion from the tine that extends a distance that is equal to or greater than the distance from which the riser extends from the tine. In some embodiments, guard 105 may be detachable from the tine. In other embodiments, guard 105 is adjustable. In other embodiments, guard 105 can be retracted into the tine.

Body 103 of the present invention further comprises a tine adjustment system 106. In some embodiments, a tine adjustment system is configured to manipulate a tine and/or a riser of the present invention. For example, a tine adjustment system of the present invention may be configured to perform a number of functions including, but not limited to, elevating the tines, lowering the tines, adjusting the pitch of the tines, adjusting the yaw of the tines, adjusting the plane of the tines, adjusting the length of the tines or combinations thereof. Tine adjustment systems are generally known to those of skill in the art and may include, but are not limited to, hydraulic systems, pneumatic systems, electrical systems, mechanical systems and the like, or combinations thereof. In some embodiments, the tine adjustment system is configured to independently manipulate each tine and/or riser.

In some embodiments, a riser of the present invention is manipulated into different positions manually or with the aid of the tine adjustment system. In some embodiments, the system used for rotating a riser is the same or different than the aforementioned tine adjustment system. For example, in one embodiment, the tine adjustment system may be configured to allow an operator of the pallet transportation assembly of the present invention to rotate one or more risers about a hinge from a "down" position to a "up" position, and vice versa, to seamlessly transition transportation of a pallet having a first base configuration to a pallet having a second base configuration.

Body 103 of the present invention further comprises a wheel 107. In some embodiments, a body for use in the present invention may include one or more wheels. In some embodiments, wheel 107 assists the operator of the pallet transportation assembly to maneuver the orientation of the pallet transportation assembly in space. In some embodiments, wheel 107 free pivots in a 360° manner. In some embodiments, the wheel is connected to a motor to provide drive to the pallet transportation assembly in order to facilitate the transportation of pallets using a pallet transportation assembly of the present invention.

Body 103 of the present invention further comprises a vertical backing portion 108. In some embodiments, vertical backing portion 108 serves to provide vertical support to the goods carried on the pallet to reduce the occurrence of toppling. In some embodiments, vertical backing portion 108 further comprises a lashing system 111. In some embodiments, lashing system 111 provides increased cargo stability by securing the cargo to the pallet transportation assembly of the present invention. Examples of lashing systems suitable for use with the present invention include, but are not limited to, strap and buckles, cords, ratcheting systems, and the like, or combinations thereof. In some embodiments, the lashing system comprises a strap, buckle, and ratcheting mechanism.

Figure 5:
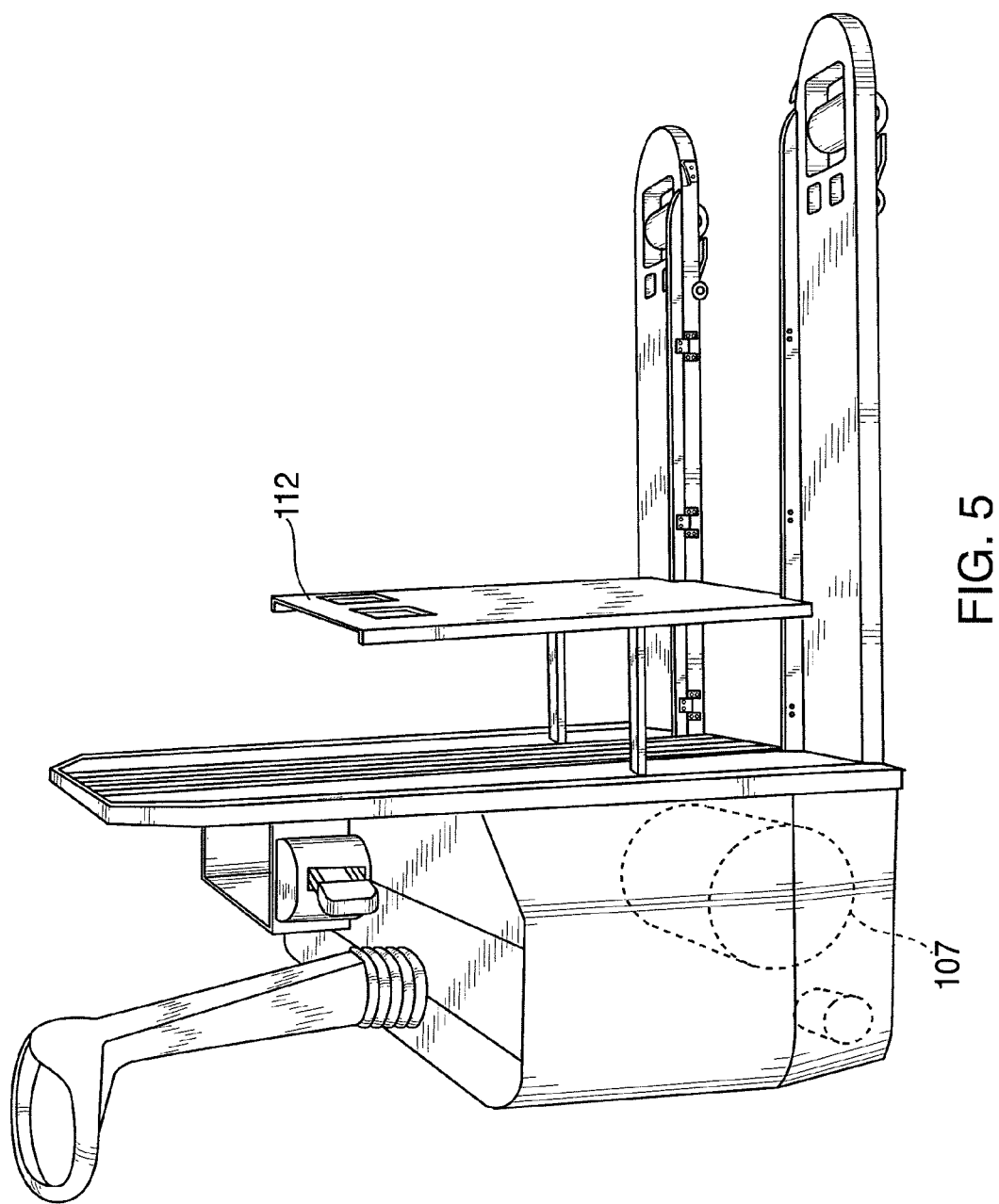
FIG. 5 shows an adjustable wall according to one embodiment of the present invention.

As seen in FIG. 5, in some embodiments, vertical backing portion 108 further comprises an adjustable wall 112. Adjustable wall 112 provides additional cargo support for loads contained on pallets smaller than the length of the tines. In some embodiments, the adjustable wall can engage the cargo, wherein the adjustable wall moves from a compartment located on the body. In some embodiments, the adjustable wall moves both laterally down the length of the tines or vertically in the plane of vertical backing portion 108. In some embodiments, the adjustable wall 112 rotates about a fixed point located in the vertical backing portion 108. In some embodiments, adjustable wall 112 further comprises a lashing system as described above. In some embodiments, adjustable wall 112 comprises notches or cavities which may be used to assist in securing the cargo being transported on the pallet transportation assembly.

In some embodiments, the present invention is directed to a pallet transportation assembly comprising a first tine having a riser hinged to an inner edge of the first tine, wherein the riser rotates on an axis parallel to the first tine; a second tine having a riser hinged to an inner or outer edge of the second tine, wherein the riser rotates on an axis parallel to the second tine; a body coupled to the first and second tines comprising a lifting mechanism to lift the first and second tines; a wheel, and a vertical backing portion.

In some embodiments, the present invention is directed to a process for transporting a first pallet having a first base configuration and a second pallet having a second base configuration, the process comprising the step of (a) providing a pallet transportation assembly comprising: a first tine having a top, a bottom, an inner edge, and an outer edge; a second tine having a top, a bottom, an inner edge, and an outer edge; and a body coupled to the first and second tines comprising a lifting mechanism, a wheel, and a vertical backing portion; wherein the first or second tine further comprises a riser; (b) positioning the riser in a first position to accommodate the first base configuration; (c) transporting the first pallet; (d) positioning the riser in a second position to accommodate the second base configuration; and (e) transporting the second pallet. In some embodiments, the first pallet and the second pallet are transported using the same pallet transportation assembly.

While not being bound by any particular theory, the present invention dramatically reduces the materials and resources needed to transport pallets between locations by providing a pallet transportation assembly that is capable of transporting pallets having differing base configurations. Furthermore, the present invention also facilitates the transportation of pallets such as those depicted in FIG. 3A and FIG. 3B. Another advantage of the present invention is the ability to retrofit present pallet transportation assemblies with the features of the present invention to increase their utility. For example, the pallet transportation assemblies described in U.S. Patent Appl. Pub. Nos. 2009/0185890, 2009/0183953, 2008/0149005, 2010/0196134, 2010/0295261 and U.S. Pat. No. 8,011,677, which are incorporated by reference in their entirety herein, may be suitable candidates for retrofitting with the features of the presently claimed invention.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments is are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

We claim:

1. A pallet transportation assembly comprising:
a first tine having a top surface, a bottom surface, and an edge surface;
a second tine having a top surface, a bottom surface, and an edge surface; and
a body coupled to the first and second tines comprising an tine adjustment system, a wheel, and a vertical backing portion;
the first and second tine further comprising a riser coupled to the tine by a hinge configured to rotate the riser 180 degrees about a longitudinal axis of the tine from a first position wherein a side surface of the riser is substantially parallel to the edge surface of the tine to a second position wherein the side surface of the riser is substantially coplanar to the edge surface of the tine.

2. The assembly of claim 1, wherein the tine adjustment system is configured to rotate the riser about the longitudinal axis of the tine.

3. The assembly of claim 1, wherein the tine adjustment system is configured to adjust the elevation, pitch, yaw, length and combinations thereof, of the first or second tine.

4. The assembly of claim 1, wherein the tine adjustment system operates pneumatically, electrically, hydraulically or a combination thereof.

5. The assembly of claim 1, wherein the riser is configured to receive a base configuration of a pallet.

6. The assembly of claim 1, wherein, the first or second tine further comprises a guard on the edge surface of the tine, configured to protect the riser from accidental contact during operation of the pallet transportation assembly.

7. The assembly of claim 1, wherein the vertical backing portion comprises a lashing system.

8. The assembly of claim 7, wherein the lashing system comprises a strap, buckle and ratcheting mechanism.

9. The assembly of claim 1, wherein the vertical backing portion comprises an adjustable wall configured to move from a first position substantially coplanar to the vertical backing portion to a second position substantially parallel to the vertical backing portion.

10. The assembly of claim 1, wherein the first and second tines are co-planar and parallel to each other.

11. A process for transporting a first pallet having a first base configuration and a second pallet having a second base configuration, the process comprising the step of:
(a) providing a pallet transportation assembly comprising:
a first tine having a top surface, a bottom surface, and an edge surface;
a second tine having a top surface, a bottom surface, and an edge surface; and
a body coupled to the first and second tines comprising an tine adjustment system, a wheel, and a vertical backing portion;
the first and second tine further comprising a riser coupled to the tine by a hinge configured to rotate the riser 180 degrees about a longitudinal axis of the tine from a first position wherein a side of the riser is substantially parallel to the edge surface of the tine to a second position wherein the side surface is substantially coplanar to the edge surface of the tine;
(b) adjusting each riser to the first position;
(c) transporting the first pallet having a first base configuration with the pallet transportation assembly;
(d) adjusting each riser to the second position; and
(e) transporting the second pallet having a second base configuration with the pallet transportation assembly.

* * * * *